(12) United States Patent
Tiengo

(10) Patent No.: US 7,081,181 B2
(45) Date of Patent: Jul. 25, 2006

(54) METHOD FOR DETACHING SUPPORTING FABRIC FROM ELASTOMERIC MATERIAL

(75) Inventor: Angelo Tiengo, Osnago (IT)

(73) Assignee: Pirelli Pneumatici S.p.A., Milan (IT)

( * ) Notice: Subject to any disclaimer, the term of this patent is extended or adjusted under 35 U.S.C. 154(b) by 0 days.

(21) Appl. No.: 10/168,064

(22) PCT Filed: Dec. 7, 2000

(86) PCT No.: PCT/EP00/12359

§ 371 (c)(1), (2), (4) Date: Oct. 21, 2002

(87) PCT Pub. No.: WO01/45923

PCT Pub. Date: Jun. 28, 2001

(65) Prior Publication Data

US 2003/0131920 A1    Jul. 17, 2003

Related U.S. Application Data

(60) Provisional application No. 60/173,289, filed on Dec. 28, 1999.

(51) Int. Cl.
*B32B 35/00* (2006.01)

(52) U.S. Cl. .................. 156/344; 156/249; 156/584
(58) Field of Classification Search ............... 156/247, 156/249, 344, 584, 541, 542, DIG. 33
See application file for complete search history.

(56) References Cited

U.S. PATENT DOCUMENTS

| | | | |
|---|---|---|---|
| 3,407,106 A * | 10/1968 | Barefoot | 156/395 |
| 3,546,042 A | 12/1970 | Beer | |
| 3,731,614 A * | 5/1973 | Smith et al. | 99/404 |
| 4,540,131 A | 9/1985 | Ishii et al. | |
| 4,580,738 A | 4/1986 | Scheer | |
| 5,108,534 A * | 4/1992 | Tveit et al. | 156/344 |
| 5,370,754 A * | 12/1994 | Soloman | 156/64 |
| 5,399,228 A * | 3/1995 | Schroeder et al. | 156/542 |
| 5,573,620 A * | 11/1996 | Sakai et al. | 156/249 |
| 6,109,323 A * | 8/2000 | Baccini | 156/378 |
| 6,349,756 B1 * | 2/2002 | Brough et al. | 156/584 |
| 6,627,027 B1 * | 9/2003 | Huang | 156/209 |
| 6,681,829 B1 * | 1/2004 | Baccini | 156/584 |
| 2004/0112534 A1 * | 6/2004 | Koizumi et al. | 156/344 |

FOREIGN PATENT DOCUMENTS

| | | |
|---|---|---|
| EP | 0 376 105 A2 | 7/1990 |
| EP | 0 621 124 A1 | 10/1994 |

* cited by examiner

*Primary Examiner*—Mark A. Osele
(74) *Attorney, Agent, or Firm*—Finnegan, Henderson, Farabow, Garrett & Dunner, L.L.P.

(57) ABSTRACT

A method for detaching a supporting fabric from a substantially-elongated piece of elastomeric material includes the steps of setting heights of a distributor and a feed device, transferring the piece from the distributor towards the feed device, and detaching the fabric from the piece during the transferring step. The heights are set before the transferring step so that, during the transfer, the piece moves along a substantially-continuous and substantially-horizontal path. A related apparatus includes at least one plane for supporting the piece, first rollers located close to an exit edge of the plane, at least one second roller, and at least one actuator for moving the second roller. The second roller moves between a first position, not in proximity to the first rollers, and a second position, in proximity to the first rollers. In the second position, the first rollers and the second roller detach the fabric from the piece.

35 Claims, 4 Drawing Sheets

METHOD FOR DETACHING SUPPORTING FABRIC FROM ELASTOMERIC MATERIAL

This application claims the benefit of Provisional Application Ser. No. 60/173,289, filed Dec. 28, 1999.

The present invention relates to a method for automatically detaching the supporting fabric attached to an element of elastomeric material, generally a length of tread band, in order to maintain its adhesiveness unchanged before it is used in a machine for tyres manufacturing.

Furthermore, the present invention relates to a device designed to automatically detach said supporting fabric; said device eases the task of the operator involved in the operation of detachment and, at the same time, makes it possible for said element to be moved towards a manufacturing drum mounted on the abovementioned machine.

More particularly, the present invention relates to the automatic detachment of the supporting fabric attached to a length of tread band for tyres of the giant type, i.e. for tyres which are suitable to be used on heavy duty vehicles and the like.

In the following of the present invention and in the pending claims, the term "elastomeric material" is intended to mean a rubber mixture in its entirety, i.e., containing at least a basic polymer, the reinforcing fillers, as well as further product and process additives normally used for manufacturing and curing a pneumatic tyre.

Tread bands for tyres of the giant type, as described further on in the course of the present description, are normally extruded continuously, because of their sizes and their weight considerably greater than the sizes and weight of the tread bands of car tyres. Thus said tread bands are cut up into pieces of predetermined length, stored in a store and taken therefrom for subsequent feeding to a tyre manufacturing machine.

Said working procedure is substantially used also in the process of tyres manufacturing for cars where, however, it is generally preferred to store the tread band temporarily in the form of a continuous piece on a storage reel together with a supporting fabric which separates the overlapping turns of the elastomeric material from each other, the cutting to length operation of said tread band being performed subsequently, after separation of the supporting fabric, during the stage in which the tread band is delivered to said manufacturing drum.

For greater simplicity of description, reference will be made in the following of the present description to processes for the manufacturing of pneumatic tyres which use lengths of tread band which have been precut to length during their manufacturing stage.

Furthermore, whenever not expressly indicated otherwise, said lengths of tread band are to be understood to be either for tyres of the giant type or for car tyres, without distinction.

In accordance with tyres manufacturing processes known in the art, the operation of removing the supporting fabric from a length of tread band is performed manually by an operator who is responsible, among other tasks, for preparing and positioning said tread band on a suitable feed device placed upstream from a manufacturing drum.

More specifically, lengths of tread band are placed on the supporting planes of a distributor means, generally a moving trolley, positioned close to the aforesaid feed device, and the operator is required to handle each piece separately.

Said pieces are carefully placed on said supporting planes in such a way that the supporting fabric is in contact with the surface of said planes.

Therefore, the operator works on each piece, turning it over a first time so that the supporting fabric is uppermost, and then detaching said fabric in a completely manual way, using only his own strength.

Once the supporting fabric has been removed from the surface of the piece, the successive operations performed by the operator depend on the nature of the process and the manufacturing machine used.

In the case where the abovementioned feed device delivers the tread band in a position above the manufacturing drum, the piece of tread band must be turned over a second time to ensure that it is correctly positioned on the cylindrical surface of the drum.

Once said second overturning movement has been performed, the operator has to manually push the tread band up onto said feed device, which is upstream from the manufacturing drum, and which is provided with motor-driven rollers or with a conveyor belt which deliver said tread band to the manufacturing drum.

When, however, said feed device delivers the tread band to a position below the manufacturing drum, the operator does not have to turn said piece over a second time once the supporting fabric has been removed, and merely has to push it towards said feed device.

According to Applicant's perception, manual performance of the abovementioned operations of turning the tread band over and detaching the supporting fabric attached to the latter is particularly onerous for the operator, because of the appreciable weight of the piece, and he is required to make a more than negligible repeated physical effort which is quite harmful to the integrity of the piece that undergoes a plurality of stretching movements and dimensional changes because of the plasticity of the nonvulcanized material, which compromise the quality of the finished product.

In fact, it should be emphasized that in the case of tyres of the giant type, each piece of tread band has a weight which generally varies between 25 and 30 kg.

Furthermore, said physical effort is not only required for turning the piece of tread band over and for detaching the supporting fabric, which must be performed at the same time over the full width of the piece, and progressively in a longitudinal direction along it, but also for conveying said piece, pushed by the operator's force, towards the feed device of the manufacturing drum.

The process of producing a tyre, in particular a tyre of the giant type, makes use of manufacturing machines which, operating according to a predetermined sequence of stages performed partly in a wholly automatic way and partly semiautomatically on two or more manufacturing drums, make it possible to assemble the plurality of semifinished components which make up a finished tyre.

Said semifinished components are represented by: the liner, i.e., a layer which is impermeable to air and which coats the inside of the carcass of a tubeless tyre, the carcass ply, the chafers, the fillers beneath the belt ply, the belt plies (in general, three separate strips of belt ply overlapped by a further strip with circumferential cords), the tread band, and the sidewalls.

The structure and the operation of a manufacturing machine as a whole are not described in the following since they are not relevant to said invention, and any manufacturing machine of the known art may therefore be taken into consideration.

As mentioned above, the tread band represents one of the semifinished products used in the manufacturing process of a tyre, and is produced by an extrusion operation by using a mixture of predetermined formulation which results in the production of a continuous piece of elastomeric material.

Through the use of dies of predetermined cross section, said continuous piece is shaped into a profile which is substantially trapezoidal in transverse cross section.

Thus, the obtained continuous piece of the tread band is subjected to a cooling stage which is conventionally performed by immersing it into a cooling liquid, e.g. water at ambient temperature.

Once said cooling stage is complete, the lower surface of said piece of tread band, that is the surface which constitutes the larger base of the above-mentioned trapezoidal cross section and which comes into contact with the abovementioned belt package during manufacturing, is attached to a supporting fabric.

Said fabric performs the function of preserving the adhesiveness of the mixture on the lower surface of the tread band, that is the surface which will come into direct contact with the underlying belt package during the tyre manufacturing process.

In fact it should be emphasized that for reasons relating to the process and the stocks in store, generally the tread band, once it has been produced, is not immediately used but remains stored in the stores for a variable period of time of between few hours and few days.

During said period of time the tread band is inevitably in contact with dust and/or dirt present in the surrounding environment; there is therefore a need to protect its surfaces, in particular to preserve its adhesiveness, by coating it with a supporting fabric.

More particularly, in the case of tread bands for vehicle tyres, a continuous piece of tread band approximately 100 meters long is wound onto a reel together with a suitable fabric, e.g. Meraklon®.

On the other hand, in the case of tread bands for giant tyres the tread band is coated with a supporting fabric which generally consists of a sheet of polyethylene.

The tread band attached to the supporting fabric is then subjected to a cutting to length operation so as to produce pieces of tread band which have predetermined dimensional features for use during the manufacturing stage, said features being suitable for the manufacturing of a particular tyre.

As mentioned above, the cut pieces of the tread band are placed on the supporting planes of a carrying trolley, known in the technical language as "book trolley", which has the special feature of having the supporting planes all hinged so as to rotate along the same side, i.e. the longer side of said planes, the latter adopting an arrangement similar to that of the pages of a book.

Once it has been loaded, said trolley is brought up close to the manufacturing machine, upstream of a manufacturing drum, where the operator, as indicated above, manually detaches the supporting fabric from the tread band and delivers it to a roller or belt feed device which feeds said manufacturing drum.

The Applicant has found that the above mentioned operations, which are traditionally performed manually by the operator with a considerable expenditure of physical effort, with a particularly high risk of accidents and with qualitative deterioration of the tyre being processed, can be performed simply, correctly and with minimum physical effort by providing the manufacturing machine with a device capable of automatically detaching the supporting fabric from the tread band and advancing said tread band towards the feed device present on said machine, upstream of the manufacturing drum.

Furthermore, the Applicant has found that said device, in addition to reducing the operator's tiredness, provides a greater saving in time in performing the abovementioned operations in comparison with the manual type procedure of the known art, to the full advantage of the productivity of the plant.

Furthermore, the Applicant has found that said device guarantees a better quality of the finished product, in that it makes it possible to avoid unnecessary and disadvantageous stress of the green elastomeric material, and to reduce the risk that portions of the supporting fabric might remain attached to the piece of tread band and, therefore, be found within the green tyre at the end of the manufacturing procedure.

According to a first aspect thereof, the present invention relates to a method for detaching a supporting fabric from a substantially long piece of elastomeric material to which it is attached, prior to transfer of said piece to a tyre manufacturing drum, characterized in that it comprises the steps of:

automatically detaching said fabric from said piece and, at the same time, moving said piece towards a feed device located upstream of said manufacturing drum in order to effect said transfer.

In accordance with the present invention, said method consists of detaching the supporting fabric simultaneously over the entire width of said elastomeric piece, progressively in a direction longitudinal to the latter. Preferably, said detachment action is performed by a traction in a direction perpendicular to the surface of attachment with said elastomeric piece, thus causing it to move towards the feed device.

In accordance with the present invention said piece of elastomeric material, provided with said supporting fabric, is taken from a distributor means and said method provides for adjusting the height of the distributor means so as to effect the transfer of the elastomeric piece onto the feed device along a substantially continuous surface which is located in a substantially horizontal position.

According to a second aspect thereof, the present invention relates to a device for the automatic detachment of a supporting fabric from a substantially long piece of elastomeric material to which it is attached, comprising:

at least a first roller which can be driven in rotation by motor means, at least a second roller, which can be moved alternately in two directions from a first resting position, in which said second roller is at a distance from said first roller, and a second working position, during the step in which said fabric is detached, in which said second roller is in contact with said first roller, and at least one actuator capable of performing said movements of said second roller.

Preferably the rotation axes of said first and second rollers are parallel to each other and located perpendicularly to the advancing direction of said elastomeric piece, said second roller being an idle roller and being driven in rotation by the contact with said first roller.

Further features and advantages of the present invention will be more clearly apparent in the light of the description of a preferred embodiment thereof with reference to the appended drawings, which are provided purely by way of explanation and without any limitative intent, in which.

Figure 1:
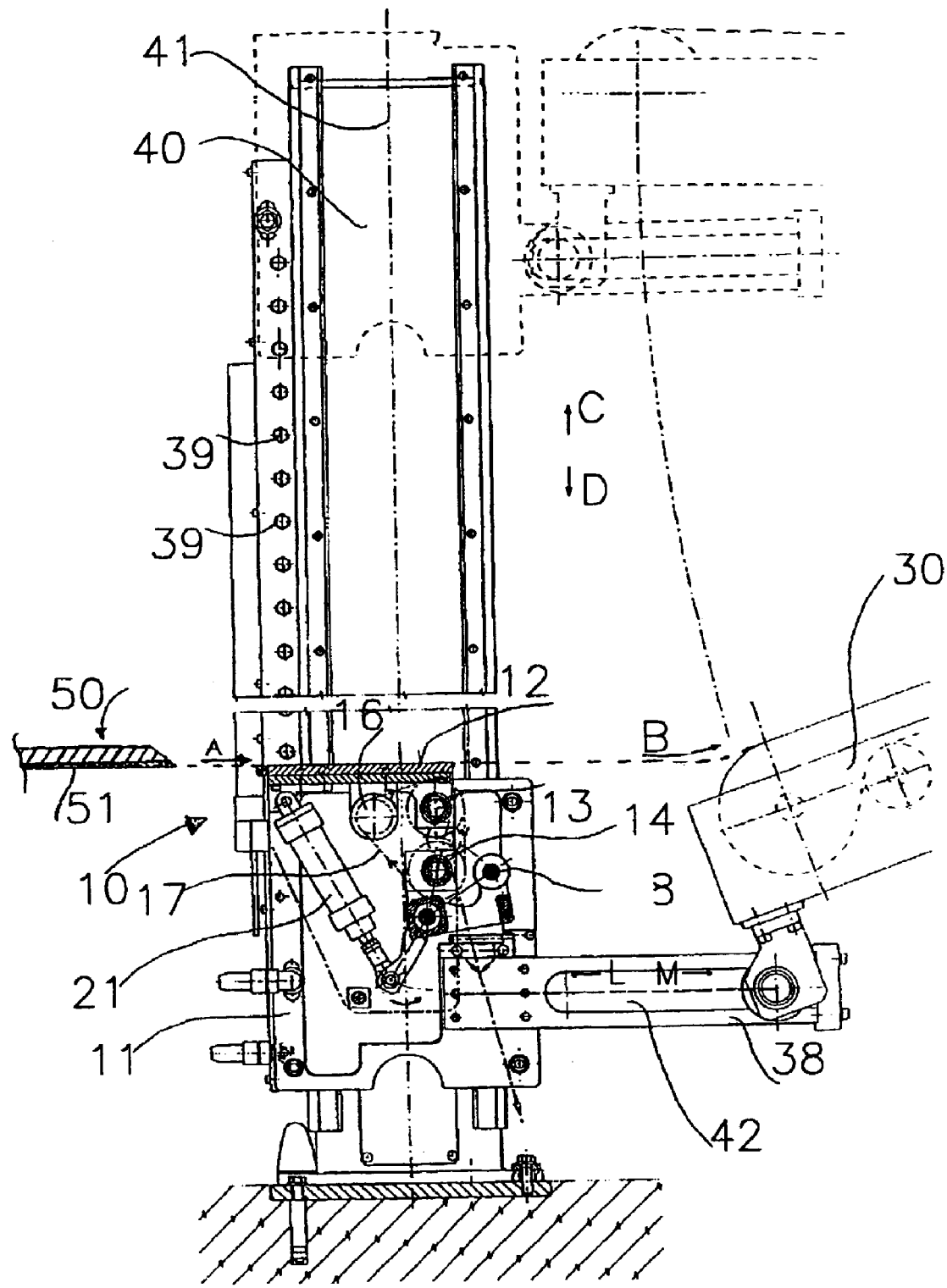
FIG. 1 shows a side view, in partial cross section, of a device for automatically detaching the supporting fabric according to the present invention, incorporated in a machine for the manufacturing of tyres.

FIG. 1 illustrates an embodiment of a device 10 for automatically detaching a supporting fabric 51 attached to a piece 50 of a tread band according to the present invention.

Figure 4:
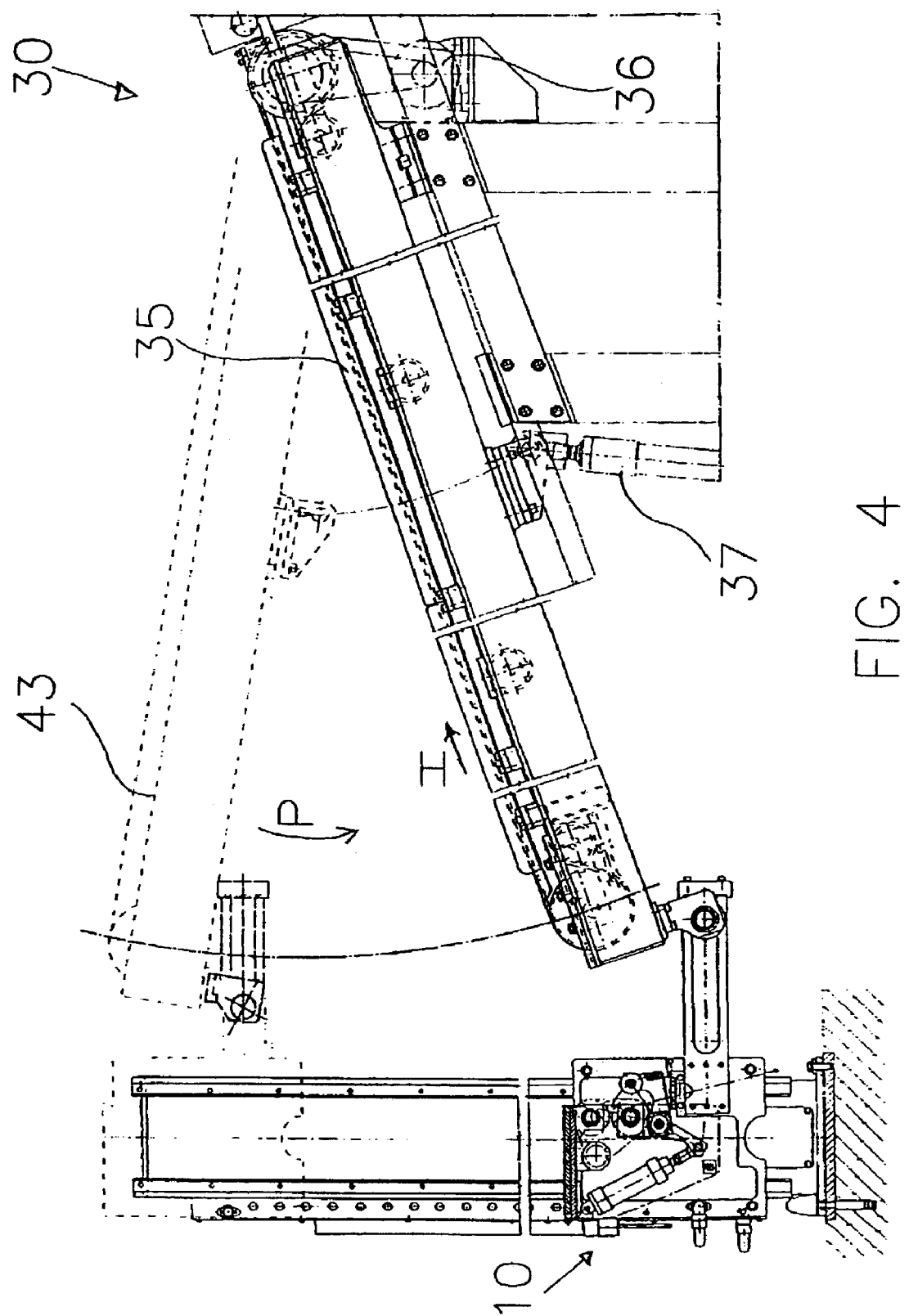
FIG. 4 shows a side view of the device in FIG. 1 incorporated with a feed device attached to the device itself.

In FIG. 1, device 10 is illustrated in the operating position, i.e. incorporated with a manufacturing machine in which there can be distinguished a feed device 30, represented in greater detail in FIG. 4, which is capable of delivering the tread bands to a manufacturing drum (not shown), and a stepwise column 40 which assists the feeding of the tread bands to the aforesaid feed device 30, as described in greater detail further in the present description.

Device 10 according to the invention comprises a load-bearing structure 11 provided with a supporting plane 12 located perpendicular to longitudinal axis 41 of stepwise column 40.

Said supporting plane 12 performs the function of the supporting surface used by the operator during the transfer of a piece 50 of a tread band from one supporting plane of said "book trolley" (not shown) (arrow A in FIG. 1) towards feed device 30 (arrow B in FIG. 1).

Furthermore, device 10 according to the present invention comprises a pair of first rollers 13, 14 which are attached to load-bearing structure 11 and arranged perpendicularly to longitudinal axis 41, i.e., perpendicularly to the advancing direction of a piece 50 of tread band.

Said first rollers 13, 14 are located close to exit edge 15 (FIGS. 2 and 3) of supporting plane 12, in a position which is lower than said edge 15, and are caused to rotate about their corresponding longitudinal axes 13', 14' by a pneumatic motor 16 incorporated in load-bearing structure 11.

Motor 16 drives a chain 17 (FIG. 1) which connects said motor to said first rollers 13, 14.

In FIG. 1, chain 17 travels clockwise and induces rotation in the same direction in the aforesaid first rollers.

Furthermore, device 10 according to the present invention comprises a second roller 18 of the idle type, unlike driven first rollers 13, 14, which is free to rotate about its longitudinal axis 18' located parallel to axes 13', 14' of first rollers 13, 14.

Said second roller 18 is supported by a bracket 60 which is secured so as to rotate about a pivot 20 in such a way that second roller 18 adopts an intermediate position between the aforesaid first rollers 13, 14 during the operating step.

In greater detail, bracket 60 comprises a first arm 19, at the free end of which is associated second roller 18, and a second arm 22, the free end 24 of which is connected to an actuator 21 which is integral with load-bearing structure 11.

In a preferred embodiment of the present invention, actuator 21 is a cylinder of the pneumatic or hydraulic type.

Figure 2:
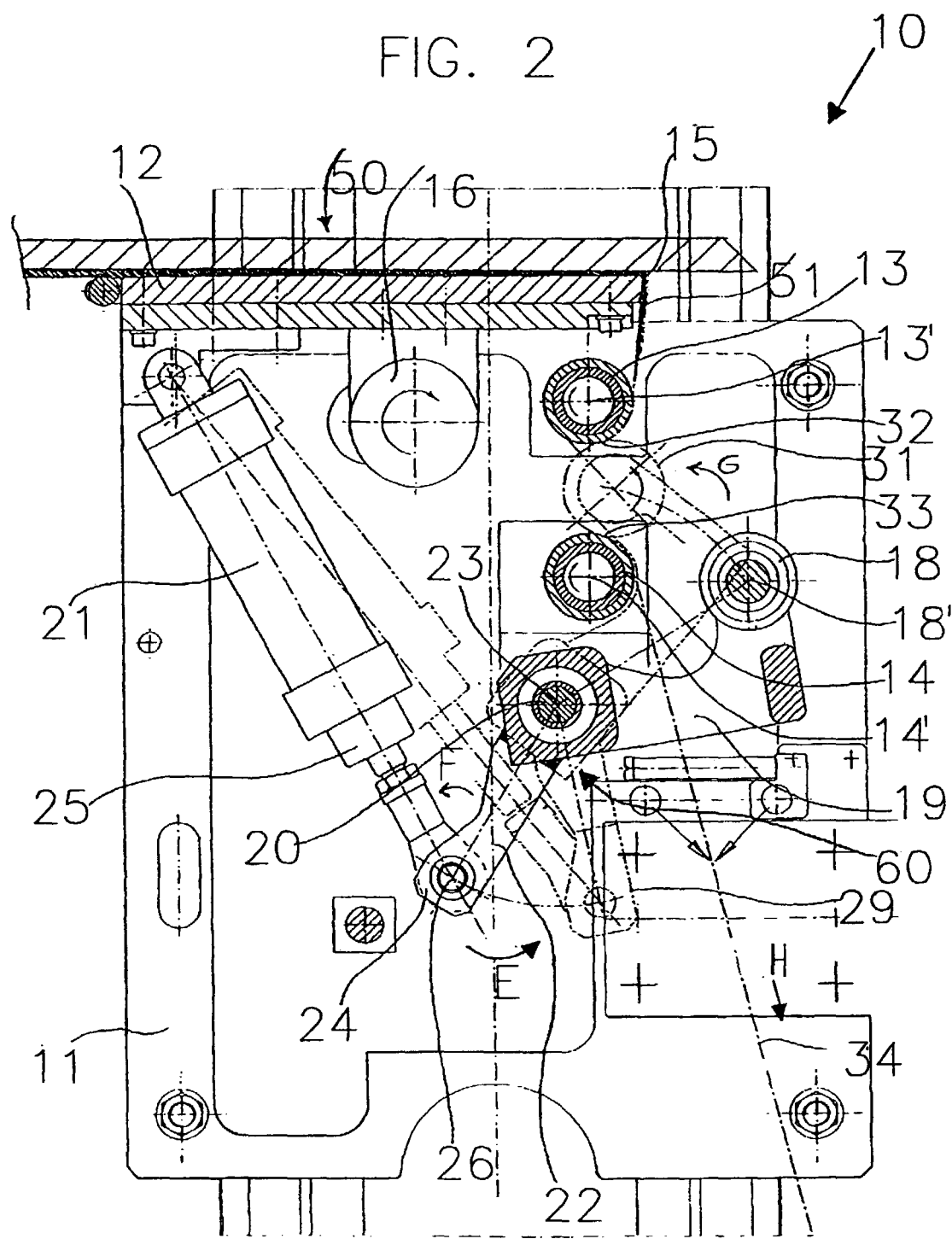
FIG. 2 shows a side view, in partial cross section, of a detail of the device in FIG. 1.
Figure 3:
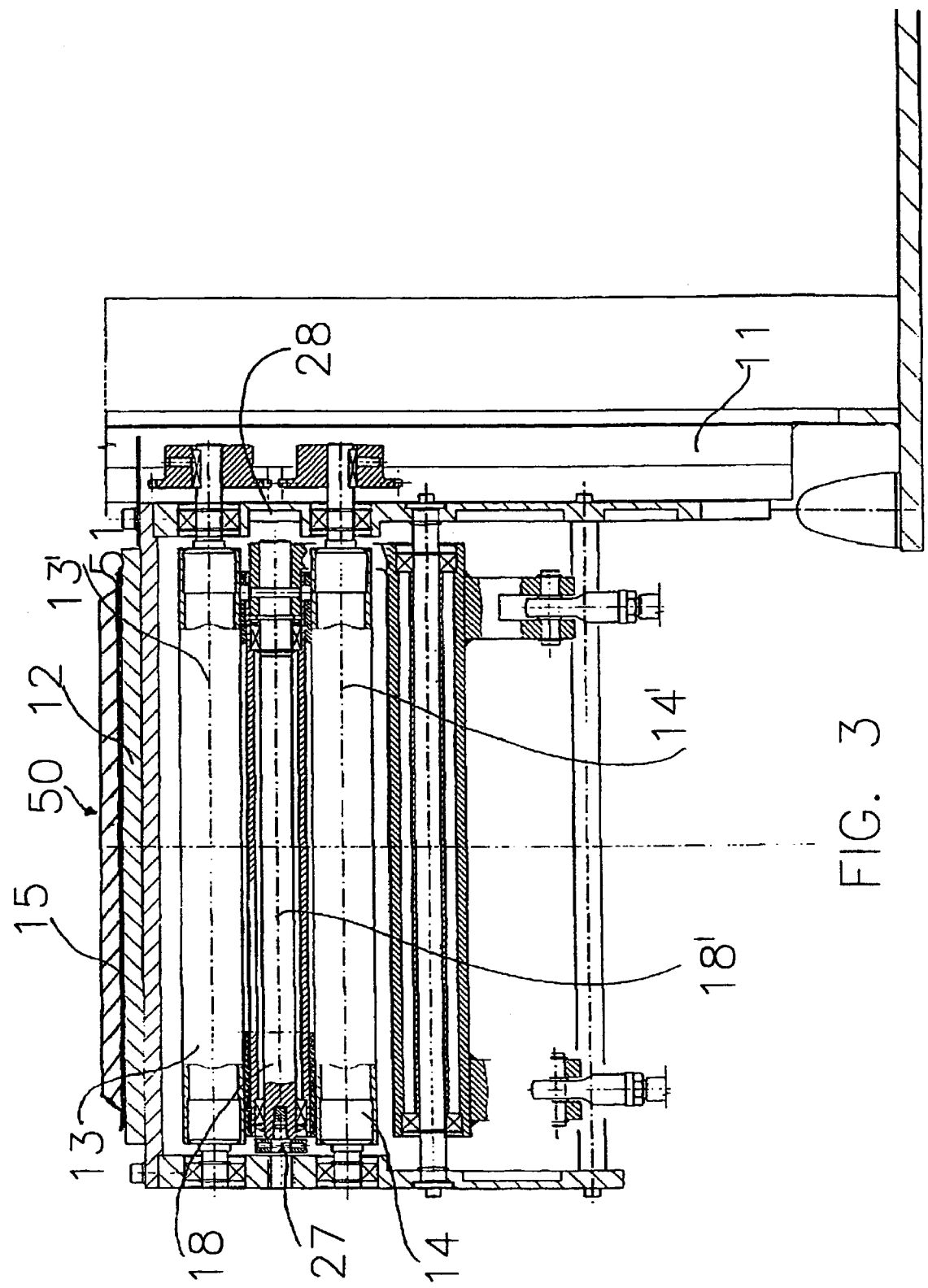
FIG. 3 shows a front view, in partial cross section, of a detail of the device in FIG. 1.

Bracket 60, comprising said first arm 19 and second arm 22, constitutes the member moving second roller 18, being secured so as to rotate about axis 23 of pivot 20 perpendicular to the plane of FIG. 2 and parallel to longitudinal axes 13', 14', 18' cited above.

Free end 24 of second arm 22 interacts with piston 25 of pneumatic cylinder 21, said end 24 and said piston 25 being pivoted so as rotate about an axis 26 parallel to axes 13', 14', 18', 23 mentioned above.

In the embodiment shown in the figures, the set of elements which permits the movement of second roller 18, said set comprising pneumatic cylinder 21, pivot 20 and bracket 60, is present at both one end 27 (FIG. 3) of second roller 18 and at a second end 28 (FIG. 3) of said second roller 18.

In a further embodiment (not shown), instead of providing a double set of movement members on each of the ends of second roller 18, there is a single set which is located, for example, in an intermediate position along the longitudinal length of said second roller.

Movement of second roller 18 into said intermediate position between first rollers 13, 14 takes place in the following ways.

The action of pneumatic cylinder 21, operated by the operator as described further on in the present description, causes piston 25 to extend and at the same time displaces said cylinder 21 (arrow E in FIG. 2) into position 29 which is represented by a dashed line in FIG. 2.

Since piston 25 is attached to second arm 22 of bracket 60 at a point along axis 26, the displacement suffered by pneumatic cylinder 21 (arrow E) causes anticlockwise rotation (arrow F) of bracket 60. Said rotation (arrow F) produces corresponding anticlockwise rotation (arrow G) of second roller 18 which thus adopts said intermediate position 31 between first rollers 13, 14, as indicated by a dashed line in FIG. 2.

In said intermediate position 31, second roller 18 contacts, substantially through contact points, both the aforesaid first rollers 13, 14 at points 32, 33 respectively, said contact ensuring that second roller 18, which is not driven, is caused to rotate by said first rollers 13, 14.

With reference to FIGS. 1 and 2, where, as mentioned above, chain 17 of motor 16 moves clockwise, second roller 18 is caused to move anticlockwise.

In general, first rollers 13, 14 are made of metallic material (e.g., Fe 430 UNI 7070) and their outer surfaces are suitably treated so as to increase their hardness, rendering them anti-adhesive with respect to the supporting fabric used, and to increase their roughness in order to ensure a greater hold on the supporting fabric itself.

Said treatment may consist, for example, of a metal coating operation through which a thin coating, e.g. of 0.1 μm, based on vanadium, molybdenum, ceramic material or metal alloys in general, is applied to the outer surface of said first rollers.

Similarly, second roller 18 is generally made of metallic material (e.g., Fe 430 UNI 7070) and is subsequently coated with an expanded polyurethane material such as, for instance, the expanded cellular Vulkollan® produced by Bayer AG.

Unlike conventional expanded polyurethane materials, said material is produced in densities between 350 and 650 kg/m$^3$ and can be compressed up to 80% of its original height with minimum permanent deformation.

Furthermore, the aforesaid material has high impact elasticity, good resistance to abrasion, good resistance to aging, atmospheric agents and a wide range of solvents, and a hardness of between 65° Shore A and 70° Shore D.

As stated above, motor 16 which is responsible for moving said first rollers 13, 14 is a motor of the pneumatic type.

In general, said motor is such as to impart a peripheral speed of between 12 and 18 m/min to said first rollers, said motor rotating, for instance, at maximum of 500 rpm, having a maximum power of 22 Nm at 250 rpm and a peak torque of approximately 28 Nm.

The drive torque provided by said motor is about 20 Nm, and the pulling force exerted on the supporting fabric, considering a roller having a radius of about 0.02 m, is about 1000 N.

Therefore, the operation of device 10 according to the present invention is as follows.

In FIG. 1, device 10 is shown in the situation in which supporting plane 12 is at the same level of the lower plane of a "book trolley" (not shown) from which the operator begins to take a piece 50 of a tread band in order to deliver it to feed device 30.

During said step, piece 50, which is still provided with supporting fabric 51 mentioned above, is positioned so that supporting fabric 51 is in contact with the surface of the plane of said trolley.

Said position is particularly advantageous in that supporting fabric 51 is already in the position which is required for the operator to slide piece 50 of tread band easily and with minimum effort from said plane of the "book trolley" towards supporting plane 12 of load-bearing structure 11 of device 10. The operator no longer has to turn over the tread band in order to remove the supporting fabric from it, as said operation is performed automatically by device 10 according to the invention, in ways which are illustrated later on in the present description.

More specifically, the operator draws piece 50 of tread band onto supporting plane 12 causing it to project beyond the end of said plane facing feed device 30 while the remainder of said piece 50 is still supported on the plane of the "book trolley" from which it is taken. At this point, the operator seizes an edge of supporting fabric 51 and manually detaches said fabric from piece 50, to which it is attached, over a short length.

The length of supporting fabric detached in this way is positioned by the operator so that it falls laterally onto load-bearng structure 11 of device 10, in correspondence of the lateral surface of first rollers 13, 14, i.e., along edge 15 of supporting plane 12.

In order to further ease the task of the operator, during the step of attaching the supporting fabric to each tread band, an edge of said fabric, close to the corner of the first end of said tread band, is deliberately not attached thereto so that the operator can use said free edge as a grip when detaching the supporting fabric.

Once the length of fabric 51 has been positioned laterally on the surface of said first rollers, the operator activates pneumatic cylinder 21 through a control panel and, in accordance with the method of operation described above, said cylinder 21 rotates the rotation axis of second roller 18, moving it from a first resting position to a second working position represented by the abovementioned intermediate position 31 between said first rollers 13, 14.

Following said rotation (arrow G), second roller 18 intercepts length of fabric 51 which has been separated manually by the operator and causes said fabric to be positioned between the outer surfaces of first rollers 13, 14 and second roller 18, remaining fixed between said rollers.

At this step, once second roller 18 has been positioned, motor 16 mentioned above comes into operation and causes said first rollers 13, 14 to rotate.

Second roller 18, although not driven, is caused to rotate by friction as a result of the contact with said first rollers and supporting fabric 51, placed between said rollers 13, 14, 18, is then separated from piece 50 of tread band in a direction perpendicular to the surface of attachment and drawn downwards.

In FIG. 2, path 34 along which supporting fabric 51 is drawn is indicated by a dashed line and the pulling direction is indicated by arrow H.

Once supporting fabric 51 has been detached from the tread band, motor 16 stops automatically and the fabric removed is collected in a suitable container, preferably placed beneath said rollers, in that it is advantageously reusable.

The pulling force exerted on supporting fabric 51 by rollers 13, 14, 18 of device 10 according to the invention, in addition to detaching said fabric from the tread band, pulls the tread band along supporting plane 12, pushing it towards feed device 30, thus allowing the transfer of said tread band from the plane of the "book trolley" (arrow A) onto the above mentioned feed device (arrow B) so that it can be delivered to a manufacturing drum located downstream from said device.

The transfer action is also assisted by activation of conveyor belt 35 with which feed device 30 is equipped, at the same time as motor 16 starts up, said conveyor belt 35 (FIG. 4) being driven by a motor 36 mounted on said feed device 30. Preferably motor 36 is associated with motor 16.

Therefore, in this way piece 50 of tread band is directed towards the manufacturing drum (arrow I in FIG. 4) driven by both the detachment operation performed by the combined rotation of rollers 13, 14, 18 of device 10 according to the invention and the action of conveyor belt 35 of feed device 30.

When the operator has emptied one or more lower planes of the abovementioned "book trolley", device 10 is moved upwards (arrow C in FIG. 1) to ease access to the higher planes in said trolley in such a way that, as mentioned above, supporting plane 12 of load-bearing structure 11 is at a height approximately equal to the height of the planes of the trolley from which the operator must take the tread bands which have yet to be delivered to feed device 30.

Generally, supporting plane 12 has to move one step upwards along column 40 after every two or three planes in the book trolley have been emptied.

More particularly, load-bearing structure 11 is capable of being moved along stepwise column 40 in a direction parallel to longitudinal axis 41 of the colunm in such a way that said load-bearing structure 11 can be raised (arrow C) during the trolley discharge cycle so as to create a substantially continuous surface with the feed device, or lowered (arrow D) when a trolley which has been emptied is replaced with a subsequent trolley which is capable of being subjected to a new unloading cycle.

Load-bearing structure 11 is moved (arrows C and D) by a cylinder 37 (FIG. 4) of the pneumatic or hydraulic type, possessed by feed device 30, the latter being attached to the aforesaid load-bearing structure 11 by means of a connecting member 38 which is integral with the load-bearing structure itself.

In other words, when the operator wishes to raise device 10 in order to unload a higher plane of said trolley, he operates cylinder 37 which controls upward movement of feed device 30.

Said movement brings about a similar rise in connecting member 38 which draws structure 11 with it, raising device 10 by a predetermined step along stepwise column 40.

In fact, said column 40 is provided with a plurality of engaging holes 39, with a predetermined spacing between them, so that the piston of cylinder 37 travels by an amount sufficient to move load-bearing structure 11 of a predetermined amount every time a pulse is provided by the operator through a suitable control panel.

Load-bearing structure 11 performs a movement equal to the predetermined step for each single pulse provided by the operator.

Therefore, the combination of the movements mentioned above makes it possible for the operator to gain access easily to all the planes of the "book trolley" and to unload the tread bands contained from the planes of the trolley easily and conveniently.

Furthermore, the operator has a tip-up footboard available to him to assist unloading said tread bands, and in its operating position this enables him to reach even the highest planes on the abovementioned trolley conveniently.

In accordance with the embodiment illustrated in the figures, connecting member 38 is provided with a guide 42 which allows feed device 30 to make two movements: a first straight movement perpendicular to longitudinal axes 13', 14', 18' of said rollers (arrows L and M) and a second movement along guide 42 in a direction perpendicular to the plane of FIG. 1.

Said first movement takes place towards load-bearing structure 11 (arrow L) as device 10 is moved upwards (arrow C) to allow the operator to gain access to the upper planes of the trolley (see position 43 in the dashed line in FIG. 4), said approach being permitted to ensure correct movement of feed device 30.

The first movement is performed away from structure 11 (arrow M) at the moment when device 10, having reached the end stop on stepwise column 40, has therefore to be returned to its starting condition to start a new unloading cycle on a subsequent trolley.

The second movement, perpendicular to the plane of FIG. 1, is performed to permit feed device 30 to deliver the tread bands to several feed lines leading to the manufacturing drum, said lines being generally possessed by the manufacturing machine.

In fact, in order to increase the productivity of a tyre manufacturing process, two separate feed lines consisting of two conveyor belts which deliver tread bands to said drum are generally provided upstream of said drum.

Said type of plant provides for the manufacturing machine, equipped with said two feed lines, to move as a block perpendicularly to the plane of FIG. 1, so that each of said lines is alternately opposite to feed device 30 in order to receive the tread bands loaded by the operator.

In order to reduce process dead times and to increase the number of tread bands loaded onto said feed lines, while at the same time ensuring greater independence of movement for the operator who is responsible for a plurality of operations on the machine in addition to loading the tread bands, feed device 30 is permitted to make the abovementioned second movement so that feed device 30 can position itself opposite to a feed line and also can load the feed line during a step in which the manufacturing machine is moved into a second working position, e.g., to deposit the belt package onto the manufacturing drum.

In this way it is guaranteed that there is always a predetermined number of tread bands (generally three) on the feed lines of the manufacturing machine, and this enables the operator to concentrate for a longer time on other working steps other than the tread band preparation and loading steps.

Therefore, the device for automatic detachment of supporting fabric from a tread band according to the present invention has a plurality of advantages which cannot be achieved by the manual type of detachment of the known art.

As cited above, a first advantage consists in easing the work of the operator by considerably reducing the physical effort required for handling a substantially long piece of elastomeric material, in particular a tread-band, and detaching a supporting fabric attached to it.

A second advantage of the present invention consists in the fact that the abovementioned operating procedure ensures better quality for the piece of elastomeric material, and therefore for the tyre as a finished product incorporating said piece, since the latter is not subjected to stretching and vigorous handling by the operator, the supporting fabric attached to it being detached automatically. As cited above, because of the high plasticity of the green material, such stretching and handling can give rise to higher or lower dimensional changes in said pieces causing a disadvantageous lack of uniformity in the finished product.

A further advantage of the present invention consists in the fact that automation of the detaching step of the supporting fabric from the elastomeric piece makes it possible to speed up said operation (eliminating, as mentioned above, one or two handling operations on said tread band such as, for instance, the first and possibly also the second overturning of the tread band) and, therefore, increasing the productivity of the manufacturing plant. In fact, in comparison with the traditional manual technique, the operator will save time and energy which can be used in the other operations which he is called upon to perform.

A further advantage consists in the fact that the detachment of the supporting fabric takes place optimally without running the risk that said fabric comes to pieces and portions of it can remain attached to the tread band. Said aspect is particularly undesirable in that said portions, trapped within the green tyre, give rise to the formation of discontinuities and air bubbles at the carcass/tread band interface during vulcanization of the tyre, starting tears which compromise the service life and a satisfactory performance of the finished product. The device according to the invention, on the other hand, makes it possible to reduce this risk to zero, given that the abovementioned rollers apply a constant and uniformly distributed pull over the entire transverse cross-section of the supporting fabric, a controlled action which cannot be guaranteed where the detachment operation is performed manually by the operator.

The invention claimed is:

1. A method for detaching supporting fabric from one or more substantially elongated pieces of elastomeric material, comprising:
   setting a first height of a distributor;
   setting a second height of a feed device;
   transferring the one or more substantially elongated pieces from the distributor towards the feed device; and
   detaching the supporting fabric from the one or more substantially elongated pieces during the transferring;
   wherein the first height is set before the transferring,
   wherein the second height is set before the transferring, and
   wherein the first and second heights are adjusted during the transferring so that the one or more substantially elongated pieces move along one or more substantially continuous and substantially horizontal paths.

2. The method of claim 1, wherein the setting of the first height is substantially equal to the setting of the second height.

3. The method of claim 1, further comprising:
   setting a third height of a plane that supports the one or more substantially elongated pieces during at least a portion of transferring the one or more substantially elongated pieces.

4. The method of claim 3, wherein the setting of the first height is substantially equal to the setting of the second height.

5. The method of claim 3, wherein the setting of the first height is substantially equal to the setting of the third height.

6. The method of claim 3, wherein the setting of the second height is substantially equal to the setting of the third height.

7. The method of claim 3, wherein the setting of the first height is substantially equal to the setting of the third height, and wherein the setting of the second height is substantially equal to the setting of the third height.

8. The method of claim 1, wherein for each substantially elongated piece, the supporting fabric is simultaneously detached over a width of the substantially elongated piece, and wherein the width is substantially perpendicular to a direction in which the substantially elongated piece moves during transferring the substantially elongated piece.

9. The method of claim 1, wherein for each substantially elongated piece, the supporting fabric is progressively detached in a direction substantially opposite to a direction in which the substantially elongated piece moves during transferring the substantially elongated piece.

10. The method of claim 1, wherein for each substantially elongated piece, detaching the supporting fabric comprises:

pulling the supporting fabric away from the substantially elongated piece in a direction substantially perpendicular to the substantially elongated piece.

11. The method of claim 1, wherein for each substantially elongated piece, detaching the supporting fabric helps the substantially elongated piece move towards the feed device.

12. The method of claim 1, wherein for each substantially elongated piece, detaching the supporting fabric comprises:

inserting an end of the supporting fabric into a pulling device.

13. The method of claim 1, wherein for each substantially elongated piece, detaching the supporting fabric comprises:

detaching an end of the supporting fabric from the substantially elongated piece; and inserting the end into a pulling device.

14. The method of claim 1, wherein for each substantially elongated piece, detaching the supporting fabric comprises:

manually detaching an end of the supporting fabric from the substantially elongated piece; and inserting the end into a pulling device.

15. The method of claim 1, wherein prior to transferring each substantially elongated piece, an end of the supporting fabric is inserted into a pulling device.

16. The method of claim 1, wherein prior to transferring each substantially elongated piece, an end of the supporting fabric is detached from the substantially elongated piece and is inserted into a pulling device.

17. The method of claim 1, wherein prior to transferring each substantially elongated piece, an end of the supporting fabric is manually detached from the substantially elongated piece and is inserted into a pulling device.

18. A method for detaching supporting fabric from a substantially elongated piece of elastomeric material, comprising:

setting a first height of a distributor;

setting a second height of a feed device;

transferring the substantially elongated piece from the distributor towards the feed device; and detaching the supporting fabric from the substantially elongated piece during the transferring;

wherein the first height is set before the transferring, wherein the second height is set before the transferring, and wherein the first and second heights are adjusted during the transferring so that the substantially elongated piece moves along one or more substantially continuous and substantially horizontal paths.

19. A method for detaching supporting fabric from a plurality of substantially elongated pieces of elastomeric material, comprising:

setting a first height of a distributor;

setting a second height of a feed device;

transferring one or more of the substantially elongated pieces from the distributor towards the feed device;

detaching the supporting fabric from the one or more substantially elongated pieces during the transferring;

adjusting the first and second heights so that the one or more substantially elongated pieces move along one of a plurality of substantially continuous and substantially horizontal paths; and repeating the transferring, detaching, and adjusting as required until all of the substantially elongated pieces are transferred;

wherein the first and second heights are set before the first transferring so that the one or more substantially elongated pieces in the first transferring move along one of the substantially continuous and substantially horizontal paths.

20. The method of claim 19, wherein the setting of the first height is substantially equal to the setting of the second height.

21. The method of claim 19, further comprising:

setting a third height of a plane that supports the plurality of substantially elongated pieces during at least a portion of transferring the plurality of substantially elongated pieces.

22. The method of claim 21, wherein the setting of the first height is substantially equal to the setting of the second height.

23. The method of claim 21, wherein the setting of the first height is substantially equal to the setting of the third height.

24. The method of claim 21, wherein the setting of the second height is substantially equal to the setting of the third height.

25. The method of claim 21, wherein the setting of the first height is substantially equal to the setting of the third height, and wherein the setting of the second height is substantially equal to the setting of the third height.

26. The method of claim 19, wherein for each substantially elongated piece, the supporting fabric is simultaneously detached over a width of the substantially elongated piece, and wherein the width is substantially perpendicular to a direction in which the substantially elongated piece moves during transferring the substantially elongated piece.

27. The method of claim 19, wherein for each substantially elongated piece, the supporting fabric is progressively detached in a direction substantially opposite to a direction in which the substantially elongated piece moves during transferring the substantially elongated piece.

28. The method of claim 19, wherein for each substantially elongated piece, detaching the supporting fabric comprises:

pulling the supporting fabric away from the substantially elongated piece in a direction substantially perpendicular to the substantially elongated piece.

29. The method of claim 19, wherein for each substantially elongated piece, detaching the supporting fabric helps the substantially elongated piece move towards the feed device.

30. The method of claim 19, wherein for each substantially elongated piece, detaching the supporting fabric comprises:

inserting an end of the supporting fabric into a pulling device.

31. The method of claim 19, wherein for each substantially elongated piece, detaching the supporting fabric comprises:

detaching an end of the supporting fabric from the substantially elongated piece; and inserting the end into a pulling device.

32. The method of claim 19, wherein for each substantially elongated piece, detaching the supporting fabric comprises:

manually detaching an end of the supporting fabric from the substantially elongated piece; and inserting the end into a pulling device.

33. The method of claim 19, wherein prior to transferring each substantially elongated piece, an end of the supporting fabric is inserted into a pulling device.

34. The method of claim 19, wherein prior to transferring each substantially elongated piece, an end of the supporting fabric is detached from the substantially elongated piece and is inserted into a pulling device.

35. The method of claim 19, wherein prior to transferring each substantially elongated piece, an end of the supporting fabric is manually detached from the substantially elongated piece and is inserted into a pulling device.

* * * * *

UNITED STATES PATENT AND TRADEMARK OFFICE
CERTIFICATE OF CORRECTION

| | |
|---|---|
| PATENT NO. | : 7,081,181 B2 |
| APPLICATION NO. | : 10/168064 |
| DATED | : July 25, 2006 |
| INVENTOR(S) | : Angelo Tiengo |

Page 1 of 1

It is certified that error appears in the above-identified patent and that said Letters Patent is hereby corrected as shown below:

Title Page, insert --(30), Foreign Application Priority Data:
EP 99125487.1..................................Dec. 21, 1999--.

Signed and Sealed this

Eighteenth Day of December, 2007

JON W. DUDAS
*Director of the United States Patent and Trademark Office*